(No Model.)
J. F. BYERS.
MECHANICAL MOVEMENT.
No. 438,799. Patented Oct. 21, 1890.
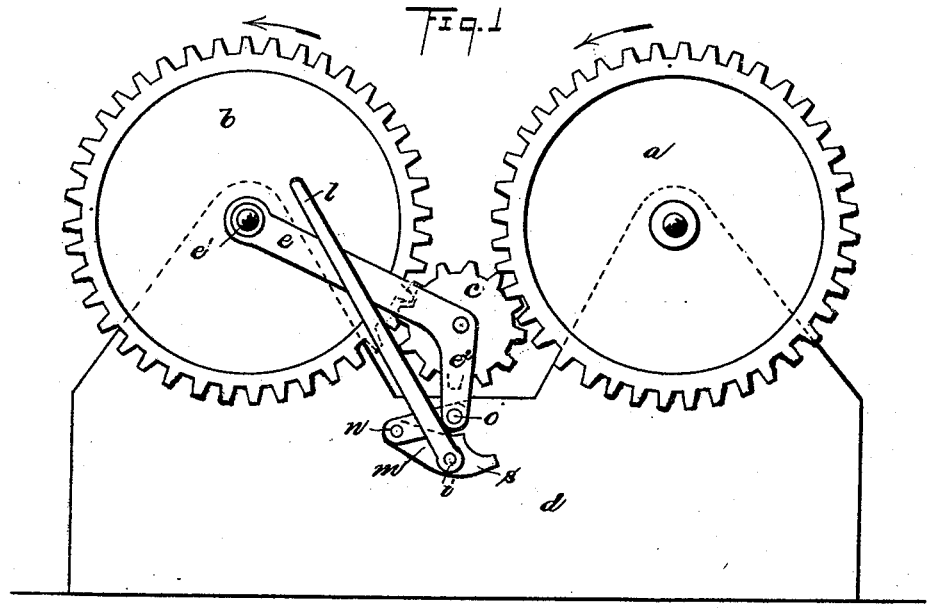
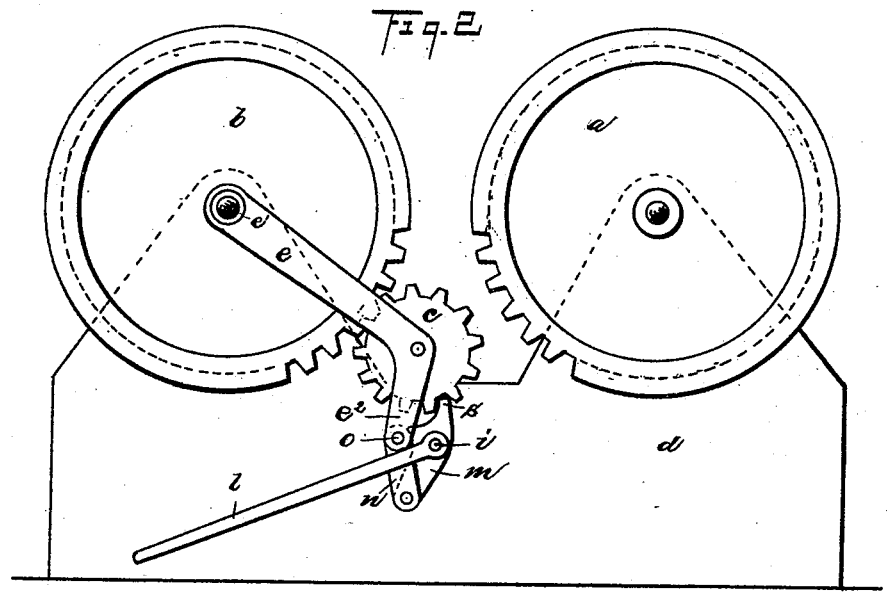
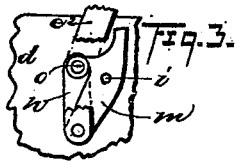
Witnesses
Bell S. Lourie
James Jewell
Inventor
John F. Byers
Bradford Howland
Attorney
THE NORRIS PETERS CO., PHOTO-LITHO., WASHINGTON, D. C.

# UNITED STATES PATENT OFFICE.

JOHN F. BYERS, OF RAVENNA, OHIO.

MECHANICAL MOVEMENT.

SPECIFICATION forming part of Letters Patent No. 438,799, dated October 21, 1890.

Application filed May 10, 1890. Serial No. 351,253. (No model.)

*To all whom it may concern:*

Be it known that I, JOHN F. BYERS, a citizen of the United States, residing at Ravenna, Portage county, Ohio, have invented a new and useful Improvement in Mechanical Movements, of which the following is a specification.

The main object of my invention is to connect two toothed wheels with an intermediate pinion, which may be disengaged from one of the wheels and lock the other, as hereinafter set forth.

In the drawings forming a part hereof, Figure 1 is an elevation representing my invention. Fig. 2 is an elevation representing the parts in changed relative positions, and Fig. 3 is a detached view.

Wheels $a$ $b$ are supported on frame $d$ and are connected by the intermediate pinion $c$, which is pivoted to arm $e$. One end of arm $e$ is loosely supported on hub $e'$ of wheel $b$. The other end of the arm is formed with a projection $e^2$, extending below pinion $c$. Rock-shaft $i$, supported in frame $d$, is connected with the lower end $e^2$ of arm $e$ by dog $m$ and link $n$. Lever $l$, attached to shaft $i$, is used to disengage pinion $c$ from wheel $a$ and lock wheel $b$ in the position shown in Fig. 2, and also to re-engage wheels $a$ $b$, as shown in Fig. 1. When driving-wheel $a$ and wheel $b$ are rotated in the direction indicated by arrows, pinion $c$ rotates in the opposite direction if in position, as shown in Fig. 1. By turning downward lever $l$, shaft $i$ and dog $m$ attached to the shaft are correspondingly turned, and link $n$ draws down arm $e$, with pinion $c$, until the latter is disengaged from wheel $a$ and the end $s$ of dog $m$ enters between the teeth of pinion $c$. The arrangement or relative positions of pinion $c$, arm $e$, link $n$, dog $m$, and shaft $i$ are such that the end $s$ of dog $m$ will enter between the teeth of pinion $c$, and at the same time the pin or pivot $o$ will be brought in contact with dog $m$, as shown in Fig. 3.

If the device herein described be used in a hoisting machine and a weight has been raised by the winding of a rope on the shaft of wheel $b$, such weight would reverse the rotation of wheel $b$ unless the latter were locked, and when locked and lever $l$ released pinion $c$ would be lifted from dog $m$ were it not retained in the position shown in Fig. 2. In such case it is so retained by pinion $c$ pressing dog $m$ firmly against pivot $o$ in arm $e$. For this purpose it is preferable that dog $m$ should be shaped or situated relatively to pivot $o$ to press somewhat downward on the latter, as shown in Fig. 3, and thereby prevent wheel $b$ from raising pinion $c$. It is obvious that the same effect will be produced if dog $m$ in locking pinion $c$ is brought in contact with arm $e$ at any point that will prevent the arm being lifted by wheel $b$. When wheels $a$ $b$ are thus disengaged from each other, wheel $a$ may be separately operated, while wheel $b$ is stationary and sustaining a weight. Wheels $a$ $b$ are connected with pinion $c$ by lifting lever $l$ when it is desired to rotate both wheels simultaneously.

I claim as my invention—

The combination of wheels $a$ $b$, pinion $c$, arm $e$, link $n$, dog $m$, and lever $l$, the pinion, arm, link, and dog being relatively arranged to cause dog $m$, when locking pinion $c$, to press against pivot $o$, substantially as described.

JOHN F. BYERS.

Witnesses:
I. L. COLLINS,
BRADFORD HOWLAND.